United States Patent
Schmitz

(10) Patent No.: US 10,518,460 B2
(45) Date of Patent: Dec. 31, 2019

(54) METHOD AND DEVICE FOR THE INDIRECT DETERMINATION OF A SPECIFIC FORMULATION DURING EXTRUSION

(71) Applicant: Windmöller & Hölscher KG, Lengerich (DE)

(72) Inventor: Torsten Schmitz, Greven (DE)

(73) Assignee: Windmöller & Hölscher KG, Lengerich (DE)

( * ) Notice: Subject to any disclaimer, the term of this patent is extended or adjusted under 35 U.S.C. 154(b) by 434 days.

(21) Appl. No.: 14/764,189

(22) PCT Filed: Jan. 29, 2014

(86) PCT No.: PCT/EP2014/051734
§ 371 (c)(1),
(2) Date: Jul. 29, 2015

(87) PCT Pub. No.: WO2014/118243
PCT Pub. Date: Aug. 7, 2014

(65) Prior Publication Data
US 2016/0009014 A1    Jan. 14, 2016

(30) Foreign Application Priority Data
Jan. 29, 2013    (DE) .................. 10 2013 100 866

(51) Int. Cl.
*B29C 47/92*    (2006.01)
*B29C 48/92*    (2019.01)

(52) U.S. Cl.
CPC ........ *B29C 48/92* (2019.02); *B29C 2948/922* (2019.02); *B29C 2948/9218* (2019.02);
(Continued)

(58) Field of Classification Search
None
See application file for complete search history.

(56) References Cited

U.S. PATENT DOCUMENTS 4,754,413 A    6/1988 Koester et al.
5,122,315 A *  6/1992 Darley .................. B29C 47/367
                                          264/40.1
(Continued)

FOREIGN PATENT DOCUMENTS

CN    85106374    3/1987
CN    101484295   7/2009
(Continued)

OTHER PUBLICATIONS

Notification of Office Action and Search Report dated Aug. 2, 2016 From the State Intellectual Property Office of the People's Republic of China Re. Applciation No. 201480006154.X and Its Translation of Office Action Into English.
(Continued)

*Primary Examiner* — Matthew J Daniels
*Assistant Examiner* — Mohammad M Ameen

(57) ABSTRACT

The invention relates to a method for the indirect determination of a specific formulation with an extrusion process in an extrusion device (10) comprising the following steps:
  determination of measurement data of at least one processing parameter of the extrusion process of the extrusion device (10),
  comparing the determined measurement data with saved data saved in relation to the specific formulation of the same processing parameter,
  determination of the deviation of the measurement data from the saved data of the same processing parameters and
  comparing of the deviation with a predefined deviation threshold.

18 Claims, 2 Drawing Sheets

(52) U.S. Cl.
CPC ........... *B29C 2948/92019* (2019.02); *B29C 2948/92038* (2019.02); *B29C 2948/92047* (2019.02); *B29C 2948/92209* (2019.02); *B29C 2948/92361* (2019.02)

(56) References Cited

U.S. PATENT DOCUMENTS

| | | | |
|---|---|---|---|
| 5,714,187 A | | 2/1998 | Froidevaux et al. |
| 2006/0138690 A1* | | 6/2006 | Schwaiger ............. B29C 47/92 264/40.6 |
| 2010/0295199 A1 | | 11/2010 | Zhang et al. |
| 2011/0144250 A1* | | 6/2011 | Meyer .................... C08K 5/526 524/115 |
| 2012/0007265 A1* | | 1/2012 | See ......................... B29C 47/38 264/40.3 |

FOREIGN PATENT DOCUMENTS

| | | | |
|---|---|---|---|
| DE | 3303766 | | 8/1984 |
| DE | 3512398 | | 4/1986 |
| DE | 3820281 | | 12/1989 |
| DE | 102004026642 | | 12/2005 |
| DE | 102006031268 | | 1/2008 |
| EP | 1313598 | | 5/2003 |
| EP | 2392446 | | 12/2011 |
| GB | 2177819 | | 1/1987 |
| GB | 2177819 A | * | 1/1987 |
| JP | 06 106605 A | * | 4/1994 |
| WO | WO 02/16097 | | 2/2002 |
| WO | WO 2014/118243 | | 8/2014 |

OTHER PUBLICATIONS

Translation of Pruefungsantrag [Request for Examination] dated Aug. 5, 2013 From the Deutsches Patent—und Markenamt [German Patent and Trademark Office] Re. Application No. 102013100866.6.
International Preliminary Report on Patentability dated Mar. 20, 2015 From the International Preliminary Examining Authority Re. Application No. PCT/EP2014/051734.
International Search Report and the Written Opinion dated May 22, 2014 From the European Patent Office Re. Application No. PCT/EP2014/051734 and Translation of Search Report in English.
Pruefungsantrag [Request for Examination] dated Aug. 5, 2013 From the Deutsches Patent—und Markenamt [German Patent and Trademark Office] Re. Application No. 102013100866.6.
Fischer "Neue Wege fuer die Automatisierung der Rohrextrusion. Kostenguenstige Loesungen bei richtigem Einsatz", Kunststoffberater, XP001354048, 30(3): 27-31, Mar. 1985.
Herrmann "Auf dem Weg zur Flexiblen und Intelligenten Aufbereitungsanlage. Die Kunsstoff-Aufbereitungstechnik 1988", Kunststoffe, XP000052617, 78(10): 876-884, Oct. 1988.
Wortberg "Automatisierung der Profilextrusion", Kunststoffe, XP000029248, 78(12): 1161-1167, Dec. 1988. p. 1161-1167, Tables 1-2, Figs. 1-7.
Mitteilung Gemäiss Artikel 94(3) EPÜ [Communication Pursuant to Article 94(3) EPC] dated Sep. 25, 2017 From the European Patent Office Re. Application No. 14702007.7 and Its Translation Into English (9 Pages).
Mitteilung Gemaess Artikel 94(3) EPU [Communication Pursuant to Article 94(3) EPC] dated Aug. 13, 2019 From the European Patent Office Re. Application No. 14702007.7 and Its Summary in English. (7 Pages).

* cited by examiner

METHOD AND DEVICE FOR THE INDIRECT DETERMINATION OF A SPECIFIC FORMULATION DURING EXTRUSION

RELATED APPLICATIONS

This application is a National Phase of PCT Patent Application No. PCT/EP2014/051734 having International filing date of Jan. 29, 2014, which claims the benefit of priority of German Patent Application No. 10 2013 100 866.6 filed on Jan. 29, 2013. The contents of the above applications are all incorporated by reference as if fully set forth herein in their entirety.

FIELD AND BACKGROUND OF THE INVENTION

The present invention relates to a method for the indirect determination of a specific formulation during an extrusion process in an extrusion device and an extrusion device for the production of an extrusion product.

It is known that extrusion products are produced with the help of extrusion devices. Thereby, for example films or blown films or cast films etc. are involved which are produced with an extrusion device. Herefore the extrusion device particularly provides a barrel extruder, in which a corresponding formulation is melted and conveyed. Thereby, an extrusion device can naturally also comprise more than one barrel extruder particularly a plurality of up to thirteen single barrel extruders. The requirements for extrusion products have increased in diverse manners, so that particularly multi-layered extrusion products should be equipped with for example different barrier properties for the film. Herefore diverse materials are necessary in order to configure the single layers of the extrusion product. With up to thirteen barrel extruders and each up to five materials therewith up to 65 different materials have to be fed in order to provide a single extrusion product with a multi-layered structure. Each specific extrusion product is thereby equipped with a specific material formulation. Such a specific formulation can thus comprise any amount of single materials between a single material and a plurality of up to for example 65 materials.

It is disadvantageously with known extrusion methods that the specific formulation can only be monitored with a high effort. Thus basically fully automated conveying systems are known which interact with silo systems. From a plurality of material silos each barrel extruder of the extrusion device is provided with a specific formulation according to the specific formulation. This is however an immense effort concerning the cost and the construction space for such a fully automated silo plant. Normally, the single materials are filled in barrel-like into the storage tanks and starting from there are supplied to the extrusion device for example using suction lances. Likewise, by the suction lances storage tanks can be filled in form of weight funnels or storage funnels. In all cases a manual adjustment of the formulation occurs in form of conscious stretching of the suction lances or explicit filling of materials in the respective storage tanks. All of this occurs manually by the operator of the extrusion device. Accordingly human sources of error are given by such a manual handling, so that the risk of an incorrect material composition for the specific formulation exists. An incorrect material composition can lead to an incorrect extrusion product for example in form of an incorrect composed multi-layered film. This leads again to film properties or product properties of the extrusion product which differ more or less intensely from the desired product. Such product properties can for example involve the sealability, the transparency, the weight or the barrier properties of this extrusion product. In a worst case an incorrect formulation is only apparent after completion of the whole extrusion product, when it shall be used in the further processing with the costumer. In such a case the whole extrusion product has to be regarded as waste which involves a high material and cost damage.

A further disadvantage is that even the clearly marked and with a detailed data sheet specified raw materials are dependent on more or less intense batch variations. This can on the one hand be the direct result of the polymerisation process with which batch variations occur in more or less narrow tolerated limits. On the other hand it is common today that due to the increasing globalisation the same raw material is produced at different production sites and the batch variations can be pronounced partly significantly stronger. Batch variations of single raw materials can have a negative influence on the process control and also on the resulting properties. Quality defects and complaints resulting from batch variations are hard to prove towards the raw material supplier from the processor's point of view and the resulting quality costs are often borne by the processor.

Many producers of plastic films control the delivered raw material on a regular basis also related to batch variations within the scope of the incoming goods inspection. Thereby, the often mentioned MFI (melt flow index) is determined, which is a "one point method" for the determination of the viscosity properties of a plastic. This method however has multiple disadvantages:
- a complex laboratory test, particularly when many plastics have to be measured multiple times,
- a reproducibility and comparability of the measurement results is partly only possible on a limited basis, since the measurements underlie multiple disturbances,
- the viscosity of plastics is a complex scale dependent from temperature and shear rate and this is only described incompletely by the MFI "one point" measurement.

SUMMARY OF THE INVENTION

It is the object of the present invention to at least partially avoid the previous disadvantages. Particularly, it is the object of the present invention to provide an increased safety for the correctness of the specific formulation during the use in the extrusion method in a cost efficient and simple manner without reducing the complexity of possibilities for the specific formulation.

The previous object is solved by a method with the features of claim 1 and an extrusion device with the features of claim 14. Further features and details of the invention result from the depending claims, the description and the drawings. Thereby, features and details which are described in connection with the method according to the invention naturally also apply in connection with the extrusion device according to the invention and vice versa, so that according to the disclosure of the single aspects of the invention it can always be reciprocally related to.

A method according to the invention serves for the indirect determination of a specific formulation with an extrusion process in an extrusion device. Such a method comprises the following steps:

determination of measurement data of at least one processing parameter of the extrusion process of the extrusion device, comparison of the determined measurement data in relation to the saved data of the same processing parameter of the specific formulation, determination of the deviation of the measurement data from the save data of the same processing parameter and comparison of the deviation with a predefined deviation threshold.

The substance of the present invention is the indirect determination of the specific formulation by the determination of measurement data of at least one processing parameter. A processing parameter is for example a machine parameter and/or a procedure parameter. An extrusion device is operated with a plurality of settings. Particularly, physical processing parameters in form of temperature or temperature courses, force courses, power consumption or pressure ratios are processing parameters which are specific for the extrusion device at different positions or different courses in relation to the respectively used formulation. Thus, for example a first specific formulation is processed in the extrusion device with other temperatures than a second specific formulation. Likewise, a higher viscose specific formulation produces a higher resistance and accordingly a higher turning movement in a barrel extruder than a low viscose specific formulation. Therewith, by the selection of at least one processing parameter preferably of a plurality of processing parameters it is possible to draw a conclusion to the specific formulation. Particularly, this occurs after a calibration and the provision of saved data of the same processing parameter, so that the comparison according to the invention between the measurement data and the save data of the same processing parameters can be performed. By the comparison with a predefined deviation threshold further a security can be ensured that material variations are allowed within a specific formulation in an allowable manner.

The determination of the measurement data of at least one processing parameter and the further procedure according to the invention is comparable with a data specific finger print of the specific formulation related to the extrusion device. This specific finger print relates to a specific formulation for the specific extrusion device. The more different processing parameters are determined the more precise is the resolution of this finger print and the more likely is the correctness during the determination of the specific formulation. Particularly, this method is used for the consequent and preferably continuous monitoring of the extrusion device during the extrusion process. Thus, not only the basically adjusted specific formulation can be examined for its correctness but also the correctness of the formulation can be monitored during the course during the extrusion process. Particularly, a characteristic line is recorded like it is subsequently described in detail.

In relation to the quality constancy of the processed raw material or the inadmissible batch variation the monitoring by the determination already during the production, particularly already in the extrusion device, can occur in a manner according to the invention. Mistakes that possibly exist and base on an unstable raw material quality or raw material composition with inadmissible negative influence on the quality of the product are in this manner already recognized during the production process. Therewith, the process can be interrupted at an early stage in order to significantly reduce the amount of produced waste. Likewise, a conclusion can be drawn to the raw material in the whole composition, which is with a high probability responsible for the mistake, from the created finger print of the recognized specific formulation. This leads to a quick trouble shooting and therewith to reduced downtimes of the extrusion device.

The method according to the invention can therewith particularly represent a supplement or a compensation of the incoming goods inspection of the delivered raw material which is used for the detection of batch variations. While for example in the MFI measurement a possible threshold of the raw material viscosity can be determined from the specification via a possibly error prone one point measurement, the evaluation of the process parameters of the extrusion process offers significantly more precise possibilities. Thus, an increased viscosity has a direct influence on the torque value of the extruder drive, on the shear heating introduced into the melting and therewith to the required heating capacity of the extruder cylinder and the resulting melting temperature and to the pressure losses of single traversed flow channels. Thresholds of parameters which are only mentioned exemplarily enable a direct conclusion to the batch variations by a comparison from the product history.

The extrusion process within the sense of the present invention particularly serves for film extrusion. Preferably a blown film extrusion or a cast film extrusion is intended. Thereby, a plurality of single extruders which each comprise a barrel extruder can configure the common extrusion device.

It can be an advantage when with the method according to the invention the filling characteristics of a template tank is used for the determination of the measurement data as at least one processing parameter, particularly the bulk density is determined as measurement data via a relation between the extracted weight and the extracted volume in a time unit. A supply tank can for example serve for combining a continuous feeding of a barrel extruder and a discontinuous filling of the supply tank. In the supply tank a minimal filling state and a maximal filling state is monitored by a sensor technology. If the filling state of the supply tank reaches the minimum by a removal using the barrel extruder, the supply tank is refilled with material. As soon as during the refilling the filling state of the supply tank reaches the maximal value the refilling stops. Further, the weight of the supply tank is monitored. By the reduction and therewith the height determination and the awareness of the geometric dimensions of the supply tank the extracted volume between the minimal value and the maximal value of the load of the supply tank can be determined in addition to the weight. From this correlation between the weight and the extracted volume preferably the bulk density can be calculated, which reflects a processing parameter as a measurement date. This bulk density in turn correlates for example with the material received in the supply tank. Thereby, the material can be monitored to its chemical and also to its physical properties. In case of a bulk density for example a monitoring of the correct form of the granules or the size of the granule scoops is possible. Naturally, an extrusion device according to the invention can comprise a plurality of supply tanks which are all configured in a manner according to the invention. Thus, the method according to the invention can be used for the determination of the specific formulation on single materials which are assembled in the single supply tanks and also on an already occurred combination of the materials.

A method according to the invention can be further established in a way that as at least one processing parameter for the determination of the measurement data the relation between the rotation speed and the torque value of a barrel extruder of the extrusion device is used. By the selection of a specific formulation shear forces result in the barrel extruder, which depend on material properties. Depending on the rotational speed with which a motor drives the barrel extruder, a necessary torque value results in order to reach this rotational speed. The necessary torque value has to overcome the resistances applied by the material or the formulation and therewith likewise gives a hint to the conveyed material in the barrel extruder. The ratio between the rotational speed and torque value thus relates to the material or the formulation which is in this ratio conveyed in the barrel extruder of the extrusion device. This applies for every single barrel extruder so that the extrusion device can monitor a plurality of this measurement data with a plurality of barrel extruders.

It is likewise an advantage when with the method according to the invention as at least one processing parameter for the determination of the measurement data the adjusting temperature profile is used over the axial course of a barrel extruder of the extrusion device. The temperature profile is particularly dependent from the used material and the therein used shear forces by the barrel extruder. The shear forces produce friction forces within the material which result in a temperature increase. The temperature profile can be further influenced from temperature devices like cooling or heating facilities at the edge of the barrel extruder. The adjusting temperature profile can therewith allow conclusions to the conveyed material stressed by shearing in the barrel extruder. Further it is possible that an existing temperature profile is reached or is not reached so that this failure or reaching of the target likewise allows a comparison between the saved data and measurement data.

Likewise it can be an advantage when with the method according to the invention the power consumption of at least one electric temperature device is used as at least one process parameter for the determination of the measurement data. Thus it is possible that the desired temperature profile is predetermined over the axial course of the barrel extruder in order to perform the extruder process. According to the used material the produced shear forces are sufficient in order to reach this temperature profile or it has to be reheated or it has to be cooled down with a too high heating. This subsequent tempering additional to the shearing forces is achieved via temperature devices in an electrical manner. By monitoring of the power consumption it is ensured that a deviation of the to be expected effort for the electrical tempering is recognized. With this measurement data likewise an explicit conclusion to the material mixture contained in the barrel extruder or the corresponding formulation is possible.

It is another advantage when with the method according to the invention as at least one process parameter for the determination of the measurement data the melting temperature is used at the tip of the barrel extruder of the extrusion device. This melting temperature has to be differentiated from the melting temperature of the used material or formulation. Thus, within the course of the conveyance by the extruder barrel the temperature of the conveyed formulation increases by shearing forces and eventually occurring electrical tempering devices, so that a melting occurs. Particularly, an overheating will occur which has again an influence on the viscosity of the conveyed materials. Thus, at the tip a melting temperature will be adjusted which likewise again involves conclusions to the formulation composition or the conveyed material. This determination of the process parameters has a great advantage, since only one single temperature sensor has to measure this temperature at the barrel extruder tip, which is preferably cost efficient and simple Likewise it can be an advantage when with the method according to the invention as at least one process parameter for the determination of the measurement data the melting pressure at the tip of the barrel extruder and/or the melting pressure loss is used via a defined melting channel geometry of the extrusion device. This melting pressure depends on the subsequent pressure loss of a nozzle subsequent to the barrel extruder. The extrusion device will dispense the liquid material via this nozzle and provide it for the production of the extrusion product. Depending on the viscosity of the melted material of the formulation at this point of time a different melting pressure is adjusted at this tip. Preferably, this measurement data are set into relation to the measurement data of the melting temperature at the tip of the barrel extruder.

It is further advantageous when with the method according to the invention as at least one process parameter for the determination of the measurement data the roll weight of a film web coiled to a wrap-around roller is used. Thereby, for example a relation to a longitudinal section, particularly the linear meter, of the coiled film web can be produced. The roller weight is preferably determined in sections, so that already before determination of the method a possible mistake can be determined by this measurement data. Preferably, a relative and/or an absolute comparison occurs. Relatively the determined weight of the wrap-around roller can be set into relation with the used starting materials in order to recognize possible mistakes. Also absolutely the to be expected square centimetre weight of the film web can be predetermined and intended as a storage date in order to serve for a comparison with the corresponding measurement data.

Likewise it is an advantage when with the method according to the invention as at least one processing parameter for the determination of the measurement data an absorption characteristic of an extrusion product is used. Particularly, this occurs concerning at least one of the following manners:
  β-radiation
  infrared radiation
  UV-radiation
  laser radiation
  ultra sound.

Thereby, the transmission as well as the reflection can be determined. Depending on the used material, here likewise a conclusion can be drawn to the formulation, so that these measurement data can influence the method according to the invention.

A further advantage can be achieved when with the method according to the invention as at least one processing parameter for the determination of the measurement data a relative comparison of the viscosity, particularly on the basis of a pressure loss in the extrusion device and/or on basis of a power consumption of the extrusion device, is used. Therewith, it is possible to achieve conclusions on the formulation already in the extrusion device preferably within the extruder. Beneath a direct determination of the viscosity by a corresponding device preferably also indirect parameters, particularly machine and/or process parameters, can be intended in order to perform a conclusion or a calculated determination of a possible viscosity deviation. Therewith, the advantages of the reduced waste amount and the quick identification of the error source within the formulation can be further improved.

Likewise it is an advantage when with the method according to the invention on basis of the determination of the measurement data a characteristic curve is recorded particularly about the production course and/or the course of a batch. Thus raw materials are partly stored in silos, which are refilled from the top by a dropping below the minimum degree of filling. Thus, in a silo a mixing of different batches of one raw material can occur, particularly even of different suppliers. By the recording of a characteristic curve the monitoring of the formulation becomes possible particularly continuously or mainly continuously at defined spaced distant point of times. Likewise, an occurring mixture of different batches in one silo as an error source can be recognized in this manner. Preferably thereby the recording of the characteristic curve occurs batch specific for the production of a product and/or continuously for the production process of the extrusion device.

By a method according to the invention it is particularly possible to make a statement about the batch variations of the single raw materials by a comparison of the recorded viscosity related data. Particularly, this is possible as a supplement and/or as a replacement for the incoming goods inspection, for example in form of the so called MFI measurement. This statement about batch variations can be used in order to recognize inadmissible deviations from the contractually agreed raw materials specification or the agreed specification of the produced film. On basis of this recognition it is possible to deduce the necessary measures for the further review of the raw material and/or the end product.

Likewise it is possible by a method according to the invention that with a deviation of the measurement data from the saved data it is examined whether the deviation is permitted or not in relation to the requirements of the process of the raw material or the end product. Likewise it is possible that the determined measurement data in case of an inadmissible deviation is used in order to confirm and/or refine and/or correct the defined deviation thresholds.

Likewise it can be an advantage when with the method according to the invention measurement data are determined from a plurality of at least two different process parameters wherein the deviations are correlated and/or added, particularly in a rated manner. This means that the finger print of a specific recipe can be determined even more precisely. Particularly, a possibly high number of process parameters is generated with measurement data, so that a particularly wide monitoring can occur. Thereby, the single deviations are added so that a total deviation and correspondingly a single standardized index for the release of an alarm or the determination of the correct specific formulation is sufficient. Since different processing parameters can make different important statements about the single formulation parts, the single processing parameters and the corresponding measurement data can be rated. The rating can also occur to the corresponding deviation, so that the addition occurs in a rated manner.

It is a further advantage, when with the method according to the invention at least two deviation thresholds are intended, wherein with exceeding of the deviation threshold different alarm levels correlate. Thus, for example with only a small deviation an information to the operating personal can occur. A subsequent examination of the correct material composition for the formulation is the consequence. If a particularly strong deviation meaning the exceeding of a high deviation threshold is recognized, this can for example lead to an immediate stop of the machine and to a necessary examination by the operating personal.

It is likewise an advantage when with the method according to the invention in dependence of the determined measurement data a corresponding specific formulation is searched in the saved data of the same processing parameters. In case that the deviation is too high thus in this manner a hint is possible, which specific formulation is wrongly adjusted. Thus, differences between the two specific formulations can be filtered, so that an explicit hint to the incorrect material in the specific formulation can be given to the operating personal.

Likewise it is an advantage when with the method according to the invention in case of a deviation of the measurement data from the saved data under the predefined deviation threshold these measurement data are added to the saved data and particularly a mean value is established with these data. Thereby, on the one hand a pool from different data sets can be provided or a transcription of the old saved data occurs with a new mean value. In both cases this is a self-taught method, so that during the ongoing use of saved data the respective specific formulation is reflected better and better. Further, in this manner also a standard deviation can be recognized and/or defined which accordingly involves an effect or an alteration of the deviation threshold.

Likewise subject of the present invention is an extrusion device for the production of an extrusion product comprising at least one sensor device and a control unit for the performance of a method according to the invention. Accordingly, this extrusion device according to the invention involves the same advantages like they are described in detail in relation to the method according to the invention. An extrusion device according to the invention serves particularly for the production of an extrusion product in form of the film, particularly in form of a blown film or a cast film.

BRIEF DESCRIPTION OF THE SEVERAL VIEWS OF THE DRAWINGS

The present invention is explained in detail using the attached drawings. The thereby used terms "left", "right", "up" and "down" relate to an orientation of the drawings with normally readable reference signs. It is schematically shown.

DESCRIPTION OF SPECIFIC EMBODIMENTS OF THE INVENTION

Figure 1:
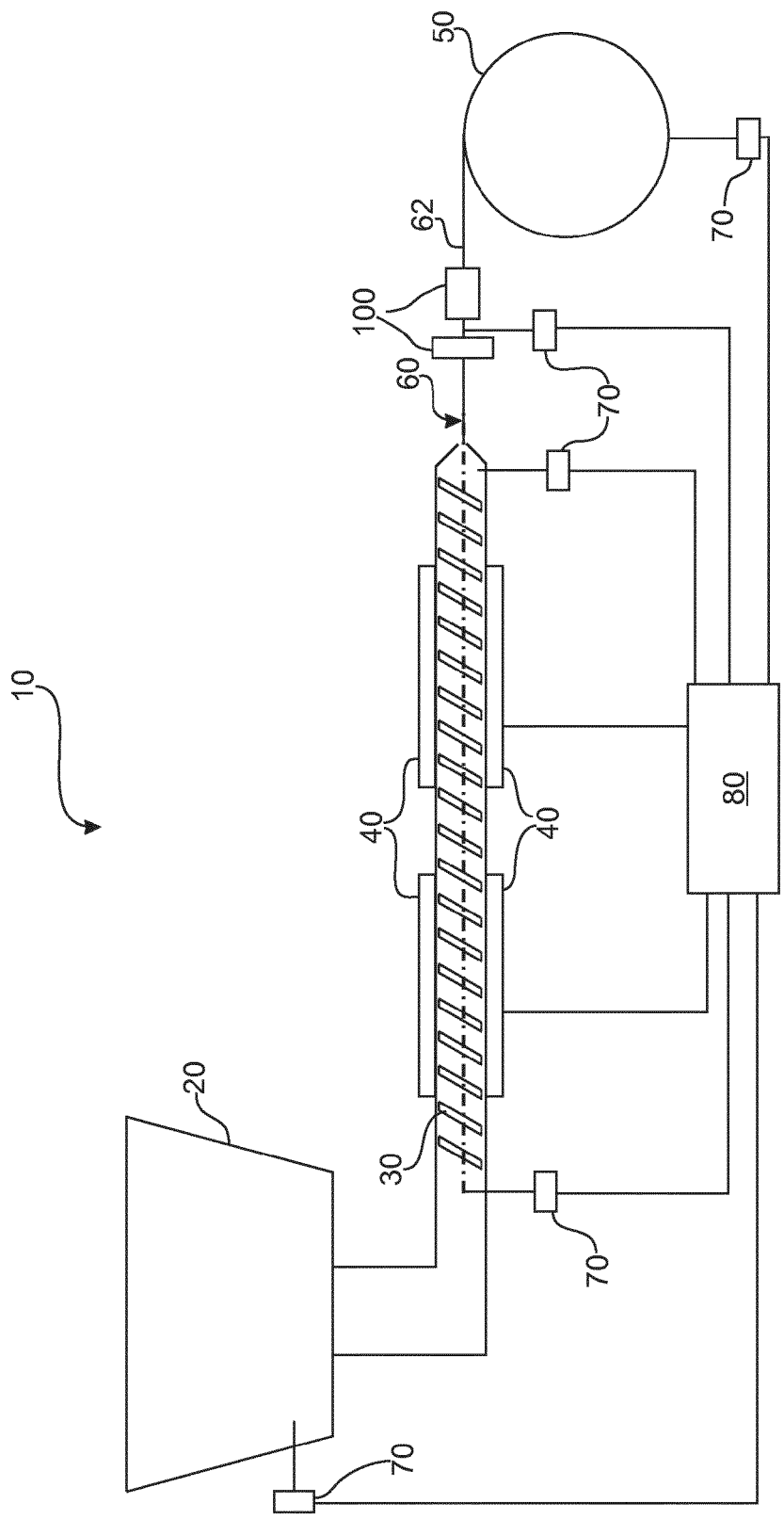
FIG. 1 a first schematic drawing of an embodiment of an extrusion device according to the invention, FIG. 2 a schematic drawing of a step of a method according to the invention.

FIG. 1 shows an embodiment of an extrusion device 10 according to the invention by which a method according to the invention can be used. This extrusion device 10 comprises for example a barrel extruder 30 which is fed with material or a formulation from different materials via a storage tank 20. A plurality of sensor devices 70 can determine measurement data for different processing parameters at different positions of the extrusion device 10.

Thus, for example the storage tank 20 is equipped with the sensor device 70 for a gravimetric determination and for filling level determination. Further, a sensor device 70 can be recognized at the left edge of the rotational axis of the barrel extruder 30, which can perceive rotational speed and/or torque value of the barrel extruder 30. At the right edge of the barrel extruder 30 a sensor device 70 is assembled, which can for example recognize the melting temperature and/or the melting pressure at this position. Likewise assembled on the right and subordinated to the nozzle of the extrusion device 10 is a sensor device 70, which can for example determine the absorption behaviour of the extrusion product 60, for example in form of a film web 62. Not last it is possible to determine the roller weight of the wrap-around roller 50 via a sensor device 70 assembled at the far right on which the extrusion product 60 is coiled. All sensor devices 70 transfer the determined measurement data to a control unit 80 in which a method according to the invention is performed. Further, in FIG. 1 between the nozzle for the extrusion product 60 and the wrap-around roller 50 tool devices 100 are assembled which can for example involve the cooling, a calibration or a guidance of the extrusion product 60. Also a blown head as a tool device 100 is possible within the scope of the present invention.

Figure 2:
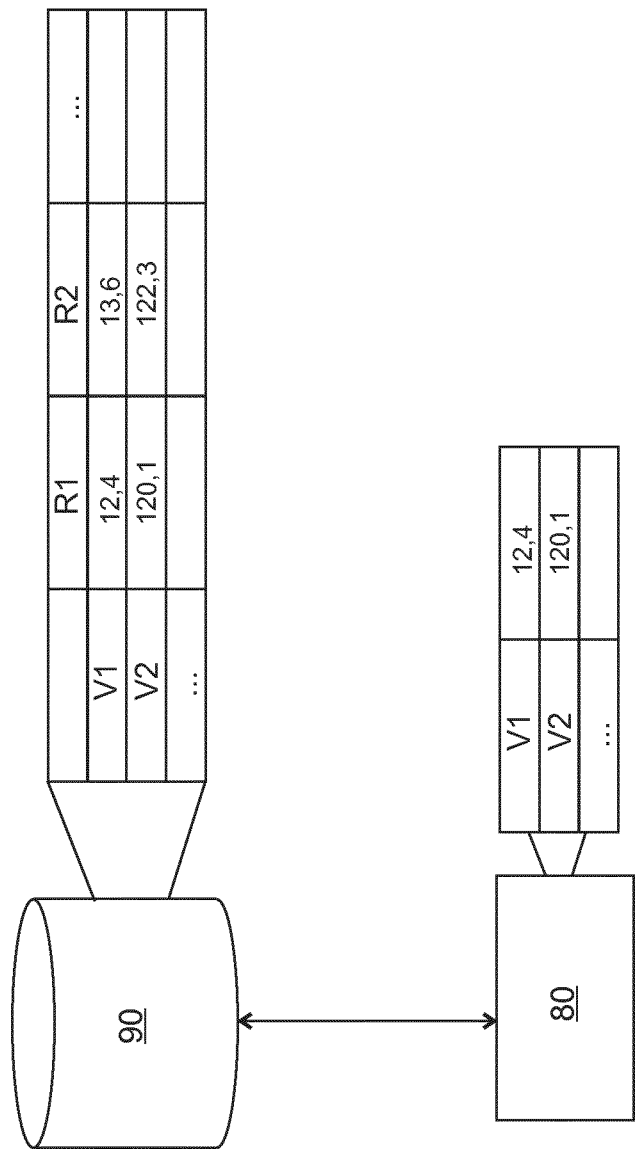

FIG. 2 shows a part of the performance of a method according to the invention. Thus, for example via the sensor devices 70 according to the embodiment of FIG. 1 for a plurality of processing parameters measurement data are determined. The measurement data of the single processing parameters of the extrusion process are at present provided as a first processing parameter V1 with the value 12.4 and as a second processing parameter V2 with the value 120.1. It is shown by these aspects that naturally a great amount of processing parameters can be supplied to the control unit 80. The control unit 80 compares the determined measurement data in a data base 90 with saved data which is saved in the data base which is specific for the single formulations R1 and R2. Like it can be recognized from the comparison that the formulation R1 is involved due to the processing parameters V1 and V2.

If in this case the desired specific formulation has to be equated with R1 the method can be continued. If however another specific formulation as R1 is desired, in this case an alarm is raised, so that a verification of the configured formulation and of the used materials can occur.

The previous description of the embodiments describes the present invention only within the scope of examples. Naturally, single features of the embodiments as far as technically meaningful can be freely combined with one another without leaving the scope of the present invention.

REFERENCE LIST

10 Extrusion device
20 Storage tank
30 Barrel extruder
40 Tempering device
50 Wrap-around roller
60 Extrusion product
62 Film web
70 Sensor device
80 Control unit
90 Data base
100 Tool device
V1 First processing parameter
V2 Second processing parameter
R1 First formulation
R2 Second formulation

What is claimed is:

1. An extrusion process, comprising: extruding a first formulation using an extrusion device, said first formulation represents a specific formulation;
measuring at least two processing parameters in said extrusion device, each by at least one sensor device in communication with a control unit,
determining admissible deviation thresholds for each of said at least two processing parameters using said control unit,
recording in a data base a characteristic curve of said first formulation in terms of said at least two processing parameters and said admissible deviation thresholds, thereby obtaining a finger print of said specific formulation that is specific for said extrusion device;
extruding a second formulation using said extrusion device, said second formulation is intended to produce said specific formulation;
measuring each of said at least two processing parameters particularly continuously or mainly continuously at defined spaced distant point of times;
comparing a measured value of each of said at least two processing parameters with said finger print; and
if each of said admissible deviation thresholds is not exceeded, continuing extruding said second formulation, or
if at least one of said admissible deviation threshold is exceeded, generating an alarm signal,
wherein:
said characteristic curve comprises a ratio of said at least two processing parameters, and
each of said admissible deviation threshold of said at least two processing parameters is a non-zero range of values that is correlated to the other in a rated manner.

2. The process of claim 1, wherein said first formulation is associated with a storage tank currently used as part of said extrusion device.

3. The process of claim 1, wherein said characteristic curve is recorded over a production course and/or a course of a batch.

4. The process of claim 1, wherein each of said at least two processing parameters is a machine parameter and/or a procedure parameter.

5. The process of claim 1, wherein each of said at least two processing parameters is selected from the group consisting of a temperature parameter, a force parameter, a power consumption parameter, and a pressure parameter.

6. The process of claim 5, wherein each of said at least two processing parameters is selected from the group consisting of:
an extracted weight in a time unit, an extracted volume in a time unit,
a rotational speed of a barrel extruder, a torque value of a barrel extruder,
a temperature profile is used over an axial course in a barrel extruder of the extrusion device,
a power consumption of at least one electric tempering device of the extrusion device,
a melting temperature at a tip of a barrel extruder of the extrusion device,
a melting pressure and/or a melting pressure loss in a melting channel of the extrusion device,
a weight of a roller of an extruded product, and
an absorption characteristic of an extrusion product.

7. The process of claim 1, wherein said ratio of said processing parameter comprises a pressure loss in the extrusion device and/or a power consumption of the extrusion device and/or a melting temperature, and a viscosity parameter based thereon.

8. The process of claim 1, wherein a level of said alarm signal is correlated to a magnitude of deviation from said admissible deviation threshold.

9. The process of claim 8, wherein said alarm signal is the extrusion process stop signal.

10. An extrusion process, comprising:
extruding a first formulation using an extrusion device, said first formulation represents a specific formulation,
measuring at least two processing parameters in said extrusion device, each by at least one sensor device in communication with a control unit;
determining admissible deviation thresholds for each of said at least two processing parameters using said control unit, each of said admissible deviation thresholds is a non-zero range of values:
recording in a data base a characteristic curve of said first formulation in terms of said at least two processing parameters and said admissible deviation thresholds, thereby obtaining a finger print of said specific formulation that is specific for said extrusion device,
extruding a second formulation using said extrusion device, said second formulation is intended to produce said specific formulation;
measuring each of said at least two processing parameters particularly continuously or mainly continuously at defined spaced distant point of times;
comparing a measured value of each of said at least two processing parameters with said finger print, and
if each of said admissible deviation thresholds is not exceeded, continuing extruding said second formulation, or
if at least one of said admissible deviation threshold is exceeded, generating an alarm signal,
wherein from said finger print of said specific formulation a raw material in said second formulation is determined, which is responsible for the mistake.

11. The process of claim 10, wherein said first formulation is associated with a storage tank currently used as part of said extrusion device.

12. The process of claim 10, wherein said characteristic curve is recorded over a production course and/or a course of a batch.

13. The process of claim 10, wherein each of said at least two processing parameters is a machine parameter and/or a procedure parameter.

14. The process of claim 10, wherein each of said at least two processing parameters is selected from the group consisting of a temperature parameter, a force parameter, a power consumption parameter, and a pressure parameter.

15. The process of claim 14, wherein each of said at least two processing parameters is selected from the group consisting of:
an extracted weight in a time unit, an extracted volume in a time unit,
a rotational speed of a barrel extruder, a torque value of a barrel extruder,
a temperature profile is used over an axial course in a barrel extruder of the extrusion device,
a power consumption of at least one electric tempering device of the extrusion device,
a melting temperature at a tip of a barrel extruder of the extrusion device,
a melting pressure and/or a melting pressure loss in a melting channel of the extrusion device,
a weight of a roller of an extruded product, and
an absorption characteristic of an extrusion product.

16. The process of claim 10, wherein said ratio of said processing parameter comprises a pressure loss in the extrusion device and/or a power consumption of the extrusion device and/or a melting temperature, and a viscosity parameter based thereon.

17. The process of claim 10, wherein a level of said alarm signal is correlated to a magnitude of deviation from said admissible deviation threshold.

18. The process of claim 17, wherein said alarm signal is the extrusion process stop signal.

* * * * *